Oct. 28, 1969  R. A. VAN BRAKEL  3,474,739
VEHICLE CONVEYOR
Filed Feb. 8, 1967  4 Sheets-Sheet 1
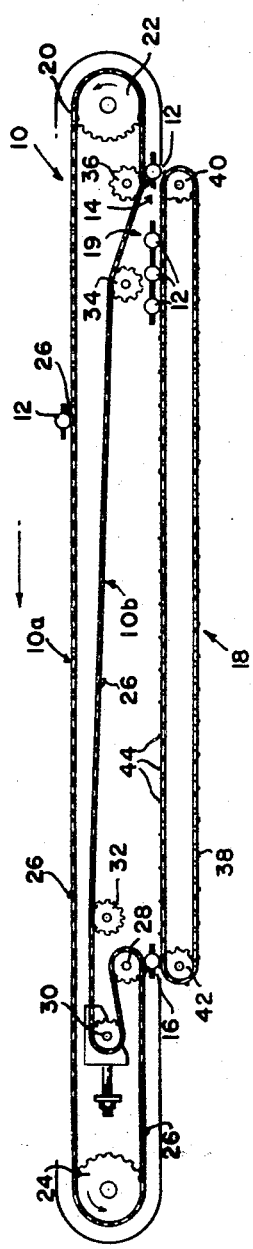
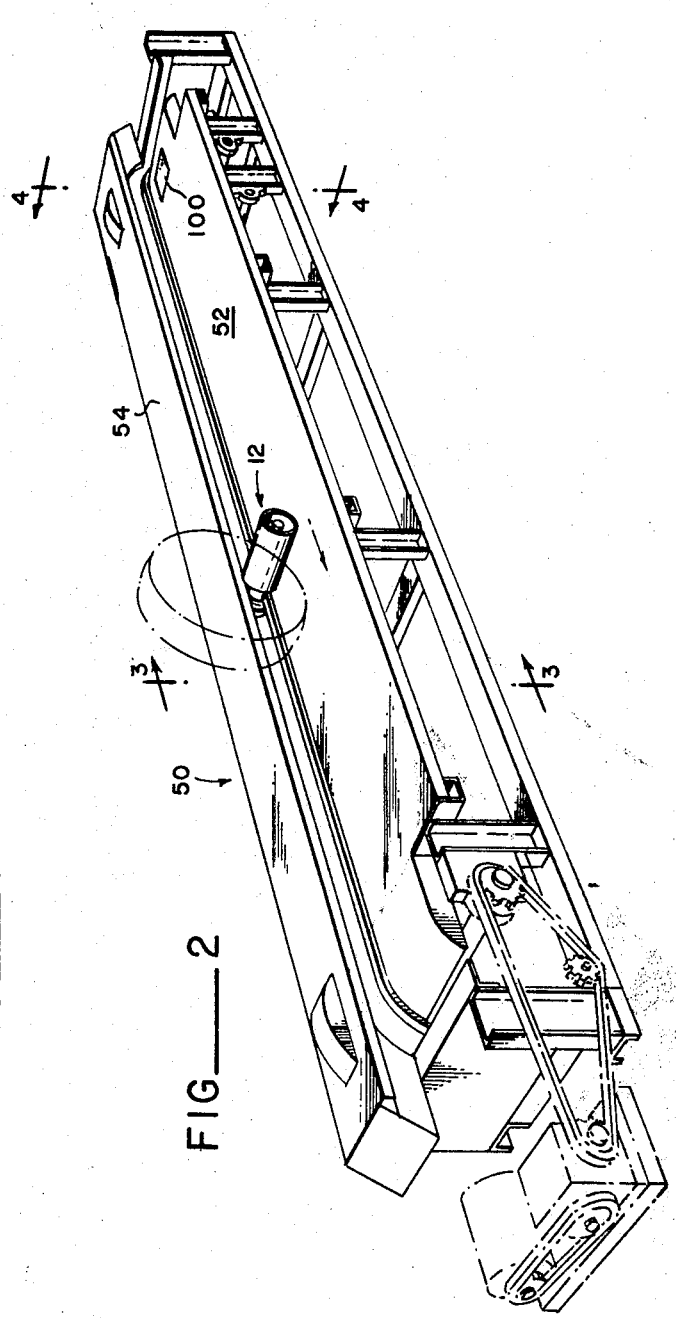
RUSSEL A. VAN BRAKEL
INVENTOR.
BY Seed & Berry
ATTORNEYS Oct. 28, 1969  R. A. VAN BRAKEL  3,474,739
VEHICLE CONVEYOR Filed Feb. 8, 1967  4 Sheets-Sheet 2

RUSSEL A. VAN BRAKEL
INVENTOR.

BY [signature]

ATTORNEYS

Oct. 28, 1969　　　　R. A. VAN BRAKEL　　　3,474,739
VEHICLE CONVEYOR
Filed Feb. 8, 1967　　　　　　　　　　　4 Sheets-Sheet 3
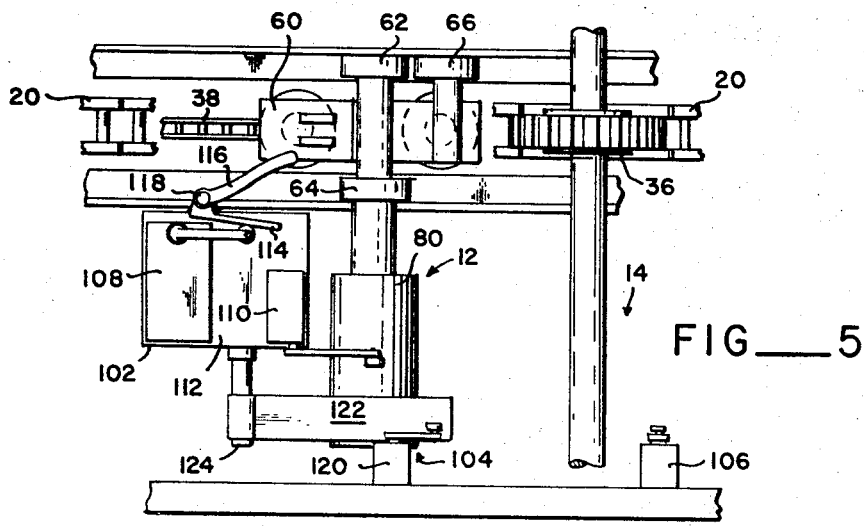
FIG__5
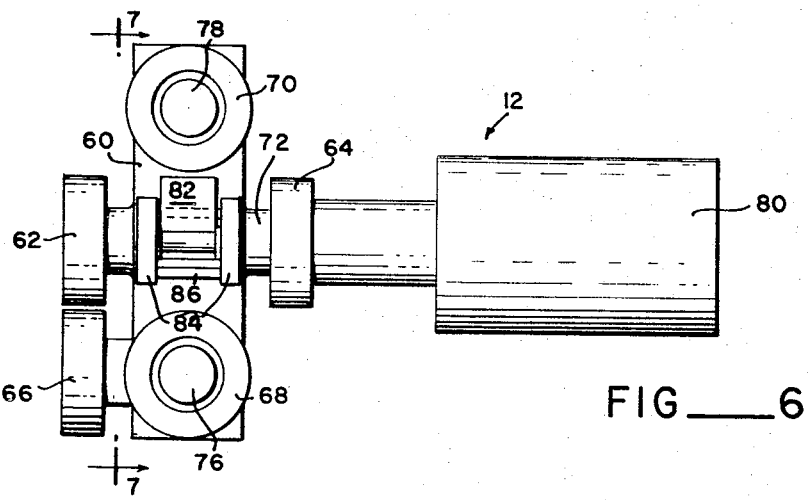
FIG__6
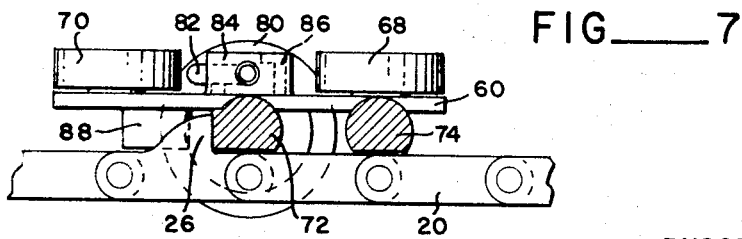
FIG__7
RUSSEL A. VAN BRAKEL
INVENTOR.
BY
ATTORNEYS Oct. 28, 1969   R. A. VAN BRAKEL   3,474,739
VEHICLE CONVEYOR
Filed Feb. 8, 1967   4 Sheets-Sheet 4
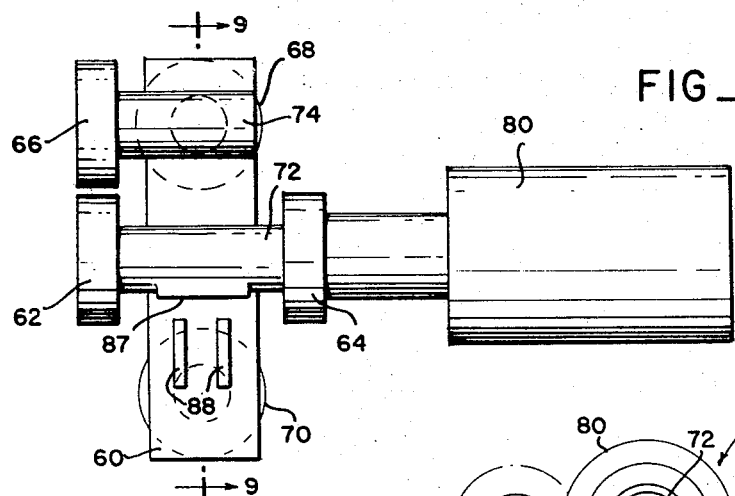
FIG_8
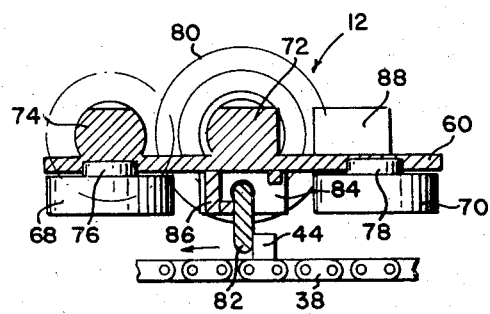
FIG_9
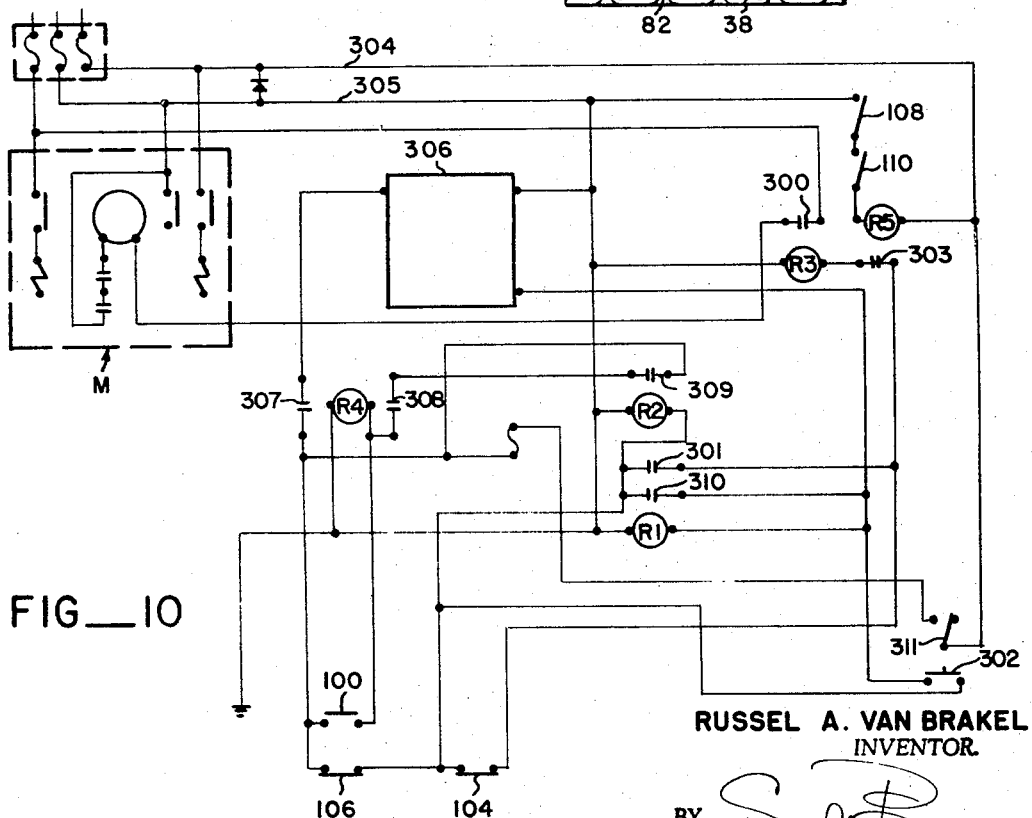
FIG_10
RUSSEL A. VAN BRAKEL
INVENTOR.
BY
ATTORNEYS

United States Patent Office 3,474,739
Patented Oct. 28, 1969

3,474,739
VEHICLE CONVEYOR
Russel A. Van Brakel, Wooddale, Ill., assignor to Haverberg Auto Laundry Co., Inc., Chicago, Ill., a corporation of Illinois
Filed Feb. 8, 1967, Ser. No. 614,619
Int. Cl. B61b *13/00;* B61c *11/00;* B65g *15/30*
U.S. Cl. 104—172           11 Claims

ABSTRACT OF THE DISCLOSURE

An automobile conveyor assembly provides an endless transport conveyor operable in a vertical plane to transport vehicle wheel pusher means from a point of engagement to the transport conveyor along a generally horizontal course paralleling the path over which a vehicle is to be transported to a point of release from the transport conveyor, and a return conveyor adapted to engage pusher means at the transport conveyor release point and transport such pusher means to the transport conveyor engaging point. Guide track means are provided to maintain the pusher means in engagement with the transport conveyor along its upper course, with the return conveyor between the release points and engaging points, and to overturn the pusher means following traverse of the transport conveyor upper course.

---

This invention relates to vehicle conveying assemblies, more particularly, this invention relates to such conveying assemblies adapted to push a vehicle along a predetermined path such as through an automobile washer.

Conveying assemblies for moving vehicles through a predetermined path of movement, such as for example through washing units and the like, have been heretofore known. Such known assemblies, however, have commonly had several inherent disadvantages, such as: requiring that pull chains be manually connected and disconnected from the vehicle at the start and completion, respectively, of the movement thereof; not being adapted for use with automatic or remote controlled wash units; being complicated or difficult to use; being cumbersome, or inefficient and impractical to use.

A primary object of this invention is to overcome such disadvantages. Another object is to provide a novel conveying system for moving vehicles. A further object is to provide such a system with automatic controls. Still another object is to provide such a system with vehicle wheel pusher means of novel design. These and other objects and advantages will become apparent from the following description and the accompanying drawings, of which:

FIG. 1 is a diagrammatic side view of a preferred embodiment of the conveyor system of this invention;

FIG. 2 is a perspective view of the preferred embodiment of this invention;

FIG. 5 is a plan view of the switch assembly shown in FIG. 4;

FIG. 6 is a top plan view of an exemplary vehicle wheel pusher means of this invention;

FIG. 7 is a cross section view taken along the line 7—7 of FIG. 6;

FIG. 8 is a bottom plan view of the FIG. 6 pusher means;

FIG. 9 is a cross section view taken alonge the line 9—9 of FIG. 8; and

FIG. 10 is an electrical schematic of an exemplary control circuit of this invention.

Figure 3:
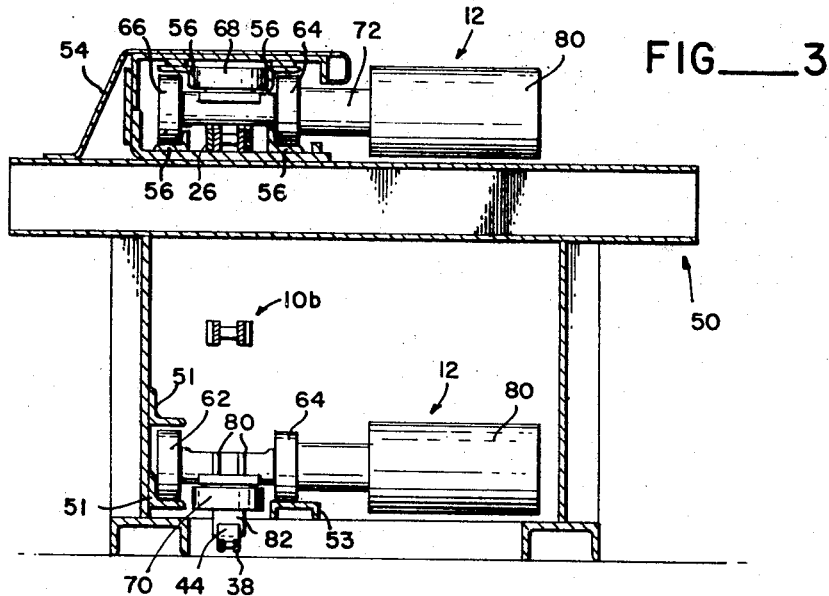
FIG. 3 is a cross section view taken along the line 3—3 of FIG. 2.
Figure 4:
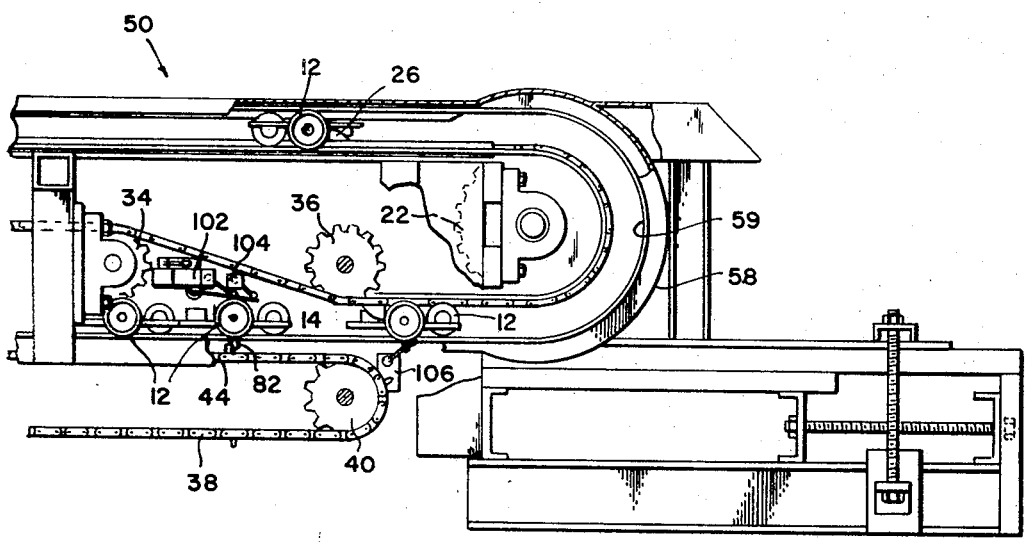
FIG. 4 is a detail cross section view taken along the line 4—4 of FIG. 2.

The vehicle conveyor assembly of this invention comprises conveyor means with a course paralleling the path that a vehicle is to be transported, a plurality of pusher means adapted to be engaged and released by the conveyor means at predetermined points and adapted to contact a vehicle and push it along its transport path, and return means adapted to engage the pusher means and transfer them from the release point to the engaging point. The FIG. 1 embodiment depicts a conveyor means 10 having a horizontal extent and disposed in a vertical plane with a horizontal upper course 10*a* and a lower return course 10*b*, a plurality of vehicle pusher means 12 adapted to be engaged at point 14 and released at point 16 by conveyor means 10, and a return conveyor means 18 disposed in the same vertical plane as conveyor means 10 and adapted to transfer the pusher means from the release point 16 to a parking station 19 and then to the engaging point 14 for pick-up.

The conveyor means 10 comprises a chain 20 meshed with end sprockets 22 and 24, either or both of which may be drive sprockets, which define the upper and lower courses 10*a* and 10*b*. A plurality of the chain links, uniformly spaced along the chain, are formed with paired outwardly extending lugs 26 adapted to engage the pusher means 12. The framework associated with the conveyor means 10 is adapted to keep an engaged pusher means in contact with the engaging lug from engaging point 14 to release point 16. At release point 16, the chain 20 reverses direction around idler sprocket 28 such that the lugs 26 will rise out of engaging contact with a formerly-engaged pusher means. The chain reverses direction again around idler sprocket 30, which is slidably adjustable to provide a means for taking up slack in the chain, and is supported between points 16 and 14 by idler sprockets 32 and 34. The chain travels downwardly from idler sprocket 34 to idler sprocket 36 such that the lugs 26 will lower into engaging contact with pusher means positioned at the engaging point 14.

The return conveyor means 18 comprises a chain 38 meshed with end sprockets 40 and 42, either or both of which may be drive sprockets. The upper course of chain 38 extends from the release point 16 to the engaging point 14. A plurality of the chain links, uniformly spaced along the chain, are provided with outwardly extending lugs 44 connected across the respective links and adapted to engage the pusher means 12 as they are disengaged from the conveyor means 10 at release point 16 and transfer such pusher means to the engaging point 14.

As depicted in FIGS. 6–9, each pusher means 12 comprises a carriage 60 that mounts shafts 72, 74, 76 and 78. Shaft 72 extends transversely across the lower midsection of carriage 60 and beyond either side in reduced section and further extends on one side in enlarged section. Bearing wheels 62 and 64 are rotatably journalled on opposite ends of the reduced section of shaft 72 and an elongated roller member 80 is rotatably journalled on the enlarged section of shaft 72. Shaft 74 extends across the trailing end of carriage 60, beyond the side opposite the roller member 80, and a bearing wheel 66 is rotatably journalled thereon in alignment with bearing wheel 62. Shafts 76 and 78 extend upwardly from the upper leading and trailing ends of carriage 60, respectively, and have bearing wheels 68 and 70 rotatably journalled respectively thereto for rotation perpendicularly to bearing wheels 62, 64 and 66. The upper midsection of carriage 60 is provided with a pusher latch 82 rotatably carried by paired outward extension members 84 of the carriage. Pusher latch 82 lays flat and extends rearwardly when the carriage is upright and swings downward by gravity, when the carriage is turned over, into vertical abutment with a crossbar 86 extending between members 84 for engagement by lugs 44. The trailing edge with respect to the direction of travel of the upper course 10a of a section of shaft 72 across the midsection of carriage 60 is provided with a rearwardly extending bearing section 87 for contact by the paired chain lugs 26. The lower trailing section of carriage 60 is provided with paired outward extension members 88 positioned to slip between the paired lugs 26 to maintain the paired lugs 26 and bearing section 87 in engaging alignment.

As depicted in FIGS. 2 and 3, the conveyor means 10 is housed within a framework 50. This framework is designed to be placed in an elongated well in an automobile washing unit. The framework comprises a flat depressed section with a coverplate 52 providing a path along which an automobile wheel can roll as it is pushed by a pusher means 12, and a raised section with a coverplate 54 covering the upper course of the chain 20 and providing a safe walk-way for washing unit personnel.

The raised section 54 also houses guide tracks, such as provided by angle irons 56, for the bearing wheels of the pusher means 12 during traverse of the upper course 10a of conveyor along means 20. These guide tracks support the bearing wheels 62, 64 and 66 such that roller member 80 is cantilevered on shaft 72, and guide bearing wheels 68 and 70 such that the pusher means is kept in proper alignment with carriage 60 parallel to chain 20.

The ends of the framework 60 are provided with end enclosures 58 having semi-circular guideways 59 which are, in effect, semi-circular extensions of the bearing wheel guide tracks between angle irons 56. These guideways 59 maintain the roller member 80 in cantilevered support and maintain proper carriage alignment as the pusher means are either transported downwardly from or upwardly to the upper course 10a.

The lower section of the framework 50, vertically below the raised section 54, is provided with guide tracks, as by angle irons 51 and channel 53, for the pusher bearing wheels 62, 64 and 66 as the pusher means are transported from one end enclosure 58 to the other by the lower course 10b of the chain 20 and the chain 38. These lower guide tracks maintain the roller member 80 cantilevered. Because there are no external forces on the roller member 80 as they are returned to the engaging point 14, no guide tracks need be provided for bearing wheels 68 and 70.

The conveyor assembly is provided with a switch-operated control system to regulate the transfer of pusher means 12 from the return conveyor means 18 to the engaging point 14 and to hold pusher means back from the engaging point at a parking station 19 when there is no vehicle to be conveyed along the upper course 10a of conveyor means 10. Because of this control system, the conveyor means 10 may be run continuously, without operating personnel concern about being tripped by pusher means periodically traversing the upper course 10a when there is no vehicle to be pushed. This control system comprises a vehicle sensing means such as a treadle operated switch 100 at the upper lead-in end of the framework 50 which actuates the return conveyor means 18 in response to being depressed by the tire of a vehicle while it is being moved under its own power onto the coverplate 52 in position to be engaged by a pusher means, a safety switch means 102, a parking switch means 104 and a pick-up point switch means 106. A delay timer is preferably provided in the control system to delay the operation of the return conveyor means a brief period after the treadle operated switch has been closed to make allowance for further travel of the vehicle until it is stopped and to give the driver time to step out of the vehicle before it is engaged by one of the pusher means 12.

Safety switch means 102 comprises two normally open microswitches 108 and 110 mounted on a plate 112 between the lower course 10b of conveyor means 10 and the conveyor means 18, each provided with an actuating swing arm and follower roller at the end thereof. The follower roller of switch 108 bears against an arm 114 of a bell crank pivoted on an axis 118 and having its other arm extending into the path traversed by one of the carriage lugs 26 of chain 20. The swing arm of the switch 110 extends downwardly into the path traversed by roller member 80. These two switches are inter-connected in the control circuit and so located with respect to one another that the lower conveyor means 18 will be inactivated when both switches are closed and remain inactivated until switch 108 is deactivated. Such concurrent switch actuation would occur in the infrequent instance when a roller 80 contacts the follower of switch 110 just after a lug 26 passes the arm 116 of switch 108. If the pusher means were permitted to continue toward the engaging point 14 under these circumstances, the lugs 26 might contact the carriage 60 ahead of the contact member 87 and thereby jam the upper conveyor means 10. After the pusher means has been stopped and the chain 20 advanced sufficiently to carry the lugs 26 out of jamming sequence, the switch 108 will be deactivated and the lower conveyor reactivated.

The parking switch means 104 comprises a normally closed microswitch 120 with an actuating swing arm and follower roller at the end thereof. The follower roller bears against a lift plate 122 that is pivotally mounted on a shaft 124. The lift plate extends downwardly into the path of the pusher means rollers 80 and is swung upwardly about the axis of shaft 124 when contacted by a roller 80 advancing forwardly thereunder. When the pusher means reaches the parking station 19 the lift plate will have raised the swing arm of switch 120 sufficiently to open the switch and this deactivates the lower conveyor means 18. The parking station is sufficiently far back from the engaging point 14 that a parked pusher means will not be engaged by lugs 26 descending to point 14. Once the lower conveyor is deactivated by switch 120, it will not be reactivated automatically until a vehicle is in position to be engaged by a pusher means, as signalled by depression of treadle 100.

The pick-up point switch means 106 also comprises a normally closed switch with a swing arm and a follower roller at the end thereof. This switch is located at the engaging point 14 and its arm extends in the traverse path of the pusher means rollers 80 so that when a pusher means reaches the engaging point 14 the switch is opened. Opening of switch 106 keeps the control circuit inactive until the pusher means at the point 14 is picked up by a set of the lugs 26 of the transport conveyor 10.

Directing attention particularly to the control circuit (FIG. 10), M represents a three phase A.C. motor for driving either of the sprockets 40, 42 of the return conveyor 18. The starter circuit for the motor includes switch 300 which is closed responsive to energizing of a realy R–3 in the event that a normally open switch 301 is closed by energizing of a relay R–1, or in the event that parking switch 104 is closed indicating a lack of a pusher means 12 at the parking position. These switches are connected in parallel between a normally closed safety switch 303 and pickup point switch 106. The latter is connected via a main control off-on switch 311 to one line 304 of a D.C. power source while the relay R–3 is connected to the other line 305 thereof. For purposes of example this power source is indicated as being rectified from the A.C. power source for the motor.

Safety switch 303 is opened by a relay R–5 in the rare event that normally open switches 108, 110 should both be closed at the same time as has been previously explained. Pick-up point switch 106 is opened when a pusher means 12 occupies the pick-up point 14. Thus, neither switch 301 nor 104 when closed can start the return conveyor motor if switches 108 and 110 are both closed or if pick-up point switch 106 is open.

Switch 301 is closed by energizing relay R–1 which occurs during the operation of a delay action timer 306 or by operation of a manual push button 302. A hold-in switch for the relay R–1 is indicated at 310. The power circuit for the timer 306 includes a normally open switch 307 which is closed by a relay R–4 having a hold-in circuit including switches 308 and 309. Relay R–4 is energized by the instantaneous closing of the treadle switch 100. However, since its hold-in circuit includes switch 309 held closed by energizing of relay R–2, and the power circuit for the latter includes pick-up point switch 106, the timer will not operate to energize relay R–1 and open switch 301 in the circuit of motor energizing relay R–3 if a pusher means is already at the pick-up point.

The manual push button switch 302 can be used by the operator to override the timer 306 if desired. However, since the pick-up point switch 106 is not bypassed by the switch 302, the operator cannot accidently cause two pusher means 12 to be fed to the engaging point 14.

What is claimed is:

1. A vehicle conveyor assembly comprising a plurality of pusher means adapted to engage and transport a vehicle along a transport path; transport conveyor means having a course paralleling the path over which a vehicle is to be transported and being adapted to engage said pusher means one at a time at a predetermined location to transport said pusher means along said course at spaced intervals, and to release said pusher means at a predetermined location after traverse of said course; return means for transporting said pusher means from the release location to the engaging location comprising a return conveyor means having an endless chain with outwardly extending lugs spaced therealong, said return conveyor means having an upper course extending between said release and engaging locations and adapted to carry the return conveyor lugs into engagement with said pusher means for transporting said pusher means from said release location to said engaging location; a framework having guide means for said pusher means providing horizontal upper and lower guideways and outwardly arched end guideways connecting the upper and lower guideways, said upper guideways being adapted to maintain said pusher means engaged with a lug of said transport conveyor means between said engaging location and said release location, said end guideways being adapted to turn said pusher means over, and said lower guideway being adapted to maintain said pusher means engaged with the lugs of said return conveyor means lugs between said release and engaging location; each said pusher means comprising a carriage, a first plurality of bearing wheels rotatably journalled to said carriage and adapted to ride on guideways straddling the chain of said transport conveyor means along the upper course thereof, a second plurality of bearing wheels perpendicular to said first plurality rotatably journalled to said carriage and adapted to ride in guideways overlaying the chain of said transport conveyor means along the upper course thereof, a roller member rotatably journalled to and cantilevered from said carriage for engaging the back of a wheel of a vehicle to be transported, latch means swingably mounted to the upper side of said carriage and adapted to lay flat when said carriage is upright during traverse of the upper course of said transport conveyor means, and adapted to swing downwardly into position for engagement by the chain lugs of said return conveyor means during traverse between said release and engaging locations, and contact means on the underside of said carriage and adapted to be engaged by the chain lugs of said transport conveyor means between said engaging and release locations.

2. A vehicle conveyor assembly comprising, a plurality of pusher means adapted to engage and transport a vehicle along a transport path; transport conveyor means having a course paralleling the path over which a vehicle is to be transported and being adapted to engage said pusher means one at a time at a predetermined location, to transport said pusher means along said course at spaced intervals, and to release said pusher means at a predetermined location after traverse of said course; return means for transporting said pusher means from the release location to the engaging location and including control means for controlling the operation of said return means which comprises activating means responsive to the approach of a vehicle to said assembly to activate said return means; parking switch means adapted to inactivate said return means when a pusher means reaches a parking position short of said engaging location; engaging switch means adapted to override the vehicle responsive means when a pusher means is at said engaging location.

3. An assembly according to claim 2 wherein said parking switch means comprises a microswitch with an actuating arm actuatable by the roller member of a pusher means as such pusher means reaches said parking position; and wherein said engaging switch means comprises a microswitch with an actuating arm actuatable by the roller member of a pusher means as such pusher means reaches said engaging location.

4. An assembly according to claim 2 including switch means responsive to the approach of a pusher means to said engaging location and responsive to the operation of said transport conveyor means to control the operation of said return means so as to prevent jamming of said conveyor means and said pusher means at said engaging location.

5. An assembly according to claim 2 in which said control means includes delay timer means for delaying the response to said activating means for a preselected time interval.

6. A pusher assembly for use with a vehicle conveyor which comprises a carriage; bearing wheels rotatably journalled to said carriage; a roller member rotatably journalled to and cantilevered from said carriage; latch means swingably mounted on the normally upper side of said carriage to lay in a normally-retracted position and adapted to swing downwardly into position for engagement by a return conveyor when said carriage is overturned; and contact means mounted on the normally underside of said carriage and adapted to be engaged by a conveyor means to push a vehicle.

7. A pusher assembly according to claim 6 including a first shaft transversely extending beyond the sides of and across the midsection of said carriage, a first one of said bearing wheels being journalled to said first shaft adjacent a first side of said carriage, a second one of said bearing wheels being journalled to said first shaft adjacent the opposite second side of said carriage, and said roller member being journalled to said first shaft such that said second bearing wheel is between said roller member and said carriage; and including a second shaft extending beyond the first side of said carriage, a third one of said bearing wheels being journalled to said second shaft in line with said first bearing wheel; and including third and fourth shafts extending from the normally upper side of said carriage at opposite end sections thereof, and fourth and fifth ones of said bearing wheels being journalled thereto, respectively, for rotation in a plane perpendicular to the plane of rotation for said first, second and third bearing wheels; and wherein said latch means is swingably mounted on said carriage between said fourth and fifth bearing wheels; and including guide members extending from the normally underside of said carriage and adapted to maintain a conveyor means in engaging alignment with said contact means.

8. A vehicle conveyor assembly which comprises a plurality of pusher means each comprising a carriage, bearing wheels rotatably journalled to said carriage, a roller member rotatably journalled to and cantilevered from said carriage, latch means swingably mounted to said carriage and adapted to swing downwardly for engagement when the carriage is upside down, and contact means adapted to be engaged by a conveyor means; transport conveyor means having a course paralleling the path over which a vehicle is to be transported and comprising a chain with outwardly extending lugs spaced therealong and adapted to engage said contact means of said pusher means, said chain traversing a horizontal upper course and traversing a lower return course adapted to carry said lugs out of and into engagement with said pusher means at pusher means release and engaging locations, respectively; return conveyor means comprising a chain with outwardly extending lugs spaced therealong adapted to engage downwardly extending latch means on said pusher means, said return conveyor means having an upper course adapted to carry the return conveyor chain lugs into engagement with said latch means for transporting said pusher from said release location to said engaging location; a framework having guide means providing horizontal upper and lower guideways and outwardly arched end guideways connecting the upper and lower guideways, said upper guideway being adapted to maintain the contact means of said pusher means engaged with the first conveyor chain lugs between said engaging location and said release location, said end guideways being adapted to turn said pusher means over, and said lower guideway being adapted to maintain the latch means of said pusher means engaged with the second return conveyor chain lugs between said release and engaging locations.

9. An assembly according to claim 8 wherein a first plurality of bearing wheels of each pusher means are adapted to ride in guideways straddling the transport conveyor chain along the upper course thereof; wherein a second plurality of bearing wheels of each pusher means are journalled perpendicular to the first plurality of bearing wheels and adapted to ride in guideways overlaying the transport conveyor chain along the upper course thereof; wherein said latch means of each pusher means is mounted on the normally upper side of said carriage and adapted to lay flat when said carriage is upright during traverse of the transport conveyor upper course; and wherein said contact means of each pusher means is mounted on the normally underside of said carriage.

10. An assembly according to claim 8 including control means for controlling the operation of said return conveyor means which comprises means responsive to the approach of a vehicle to said assembly to activate said return conveyor means and engaging switch means adapted to deactivate said return conveyor means when a pusher means occupies said engaging location.

11. A vehicle conveyor assembly comprising a transport conveyor means having an upper course paralleling the path over which a vehicle is to be transported and a lower return course, the transport conveyor means being provided with pusher-engaging lugs adapted to engage pusher means at a predetermined location and to transport such pusher means along the upper course and to release such pusher means at a predetermined location after traverse of the upper course; return means extending between the release and engaging positions and being provided with lugs adapted to engage pusher means at the release location and transport such pusher means to the engaging location; guide means providing upper and lower pusher means guideways and outwardly-arched end guideways connecting the upper and lower guideways, the upper guideway being adapted to maintain pusher means engaged with transport conveyor lugs along its upper course, the end guideways being adapted to overturn pusher means end-for-end, and the lower guideway being adapted to maintain pusher means engaged with return conveyor lugs between the release and engaging locations; and a plurality of pusher means each having a carriage, bearing wheels mounted by the carriage and adapted to track in the guideways, and a roller member rotatably journaled to the carriage, and latch means swingably mounted to the carriage and adapted to swing into an extended position when the carriage is overturned by the end guideway leading to the release location for transporting contact by a return conveyor lug in the release location and adapted to swing into a retracted position when the carriage is overturned by the end guideway following the engaging location.

References Cited
UNITED STATES PATENTS 3,057,456   10/1962   Heinzer _____ 104—172
3,196,806   7/1965   Brunder _____ 104—172

ARTHUR L. LA POINT, Primary Examiner

DANIEL F. WORTH, III, Assistant Examiner